United States Patent
Fowler (10) Patent No.: US 7,113,922 B2
(45) Date of Patent: Sep. 26, 2006

(54) ELECTRONIC INVENTORY MOVEMENT AND CONTROL DEVICE

(75) Inventor: Carl Fowler, Boulder, CO (US)

(73) Assignee: Living Naturally, LLC, Wichita, KS (US)

( * ) Notice: Subject to any disclaimer, the term of this patent is extended or adjusted under 35 U.S.C. 154(b) by 735 days.

(21) Appl. No.: 10/010,552

(22) Filed: Nov. 2, 2001

(65) Prior Publication Data

US 2002/0091593 A1 Jul. 11, 2002

Related U.S. Application Data

(60) Provisional application No. 60/245,357, filed on Nov. 2, 2000.

(51) Int. Cl.
 *G06G 1/00* (2006.01)
(52) U.S. Cl. .......................................... 705/28; 705/22
(58) Field of Classification Search .................. 705/28, 705/22
See application file for complete search history.

(56) References Cited

U.S. PATENT DOCUMENTS

| | | | | |
|---|---|---|---|---|
| 4,864,507 A | * | 9/1989 | Ebling et al. ................ | 700/99 |
| 5,666,493 A | * | 9/1997 | Wojcik et al. ................ | 705/26 |
| 6,089,453 A | * | 7/2000 | Kayser et al. ............... | 235/383 |
| 6,182,053 B1 | * | 1/2001 | Rauber et al. ................ | 705/28 |
| 6,625,581 B1 | * | 9/2003 | Perkowski .................... | 705/27 |
| 2002/0050526 A1 | * | 5/2002 | Swartz et al. .......... | 235/472.02 |

FOREIGN PATENT DOCUMENTS

EP 0454458 * 10/1991

OTHER PUBLICATIONS

Barbati, Carl, "Computer-Linked products to be central FMI exhibits", Supermarket News, v34, pS3 (2), Apr. 23, 1984.*

* cited by examiner

*Primary Examiner*—Michael Cuff
(74) *Attorney, Agent, or Firm*—Martin G. Ozinga; Phillips McFall McCaffrey McVay & Murrah, P.C.

(57) ABSTRACT

Disclosed is a method and apparatus to electronically tabulate items marked with a bar code. The system may optionally operate to manage, control and tabulate inventory, produce vendor-correct purchase orders, manage multiple locations, multiple buildings, multiple clients and multiple stores to facilitate efficiency for a wholesaler or retailer or alternatively for a distributor, broker or sales agent. The system may alternatively be used to manage inventory for a manufacturing environment or for tracking evidence or items in a chain of custody environment useful for governmental and scientific functions.

13 Claims, 4 Drawing Sheets

ELECTRONIC INVENTORY MOVEMENT AND CONTROL DEVICE

RELATED APPLICATIONS

This application claims benefit of priority to provisional application Ser. No. 60/245,357 filed Nov. 2, 2000, which is hereby incorporated by reference to the same extent as though fully disclosed herein.

BACKGROUND

1. Field of the Invention

This invention pertains to electronic inventory control utilizing a pre-programmed, handheld, computer scanner. Specifically the palm-sized device maintains database tables relating bar code scanned items to functions and optional Internet connectivity. The applicability of this device including the programming includes but is not limited to retail stores in accounting for inventory flow control, manufacturing enterprises where many parts are combined and need to be accounted for in the transition from individual parts to assembled parts as well as the multitude of parts; government agencies and scientific laboratories which must account for movements and locations of evidence or samples; distribution companies which visit on-site purchases and account for their own inventory on shelves or in stockrooms, such as in hospitals, doctor's offices, veterinary clinics, wholesale and retail outlets, grocery stores and others.

2. Description of Related Art

A. Technology (i) Hand-Held Computers

In the last several years, there has been increasing popularity in the use of hand-held computers. These devices have improved in memory and power. In 1993 Apple produced the Newton, a personal computer; it did not succeed. However, Apple coined the term PDA (personal digital assistant) and began a revolution in computing. It is estimated that venture capitalists spent a billion dollars attempting to develop PDAs in the early 1990s. In 1994, Palm Computing designed the first successful PDA, with the core functions of calendar, to do list, address book, and memo-writing features. Popularized by Palm, and PDAs are now produced by Casio, HP, Sony, Psion, Compaq, Motorola, Hand Spring and. Microsoft developed the Windows CE operating system for PDAs.

Typically users input data to the PDA using shorthand scripts. Palm popularized its "Graffiti" language which is more efficient than Apple's first attempts to have the Newton recognize any script. With regard to numerical data input there often exists inefficiencies in data entry.

(ii) Bar Codes and Scanners

In 1948, Silver and Woodland invented a "bulls eye" code for cash registers. It could not maintain inventory or collect data. The Woodland and Silver patent application was issued Oct. 7, 1952 as U.S. Pat. No. 2,612,994. In 1951, optical character recognition (OCR) was invented. In 1967 bar code scanning by OCR was first used in supermarkets. In 1973 the Uniform Code Counsel was instituted to develop Uniform Product Codes—UPCs. Subsequently point of sale devices, such as electronic cash registers and scanners used UPC codes to price items and to track sales. Bar codes have also been used to track the movement of items, assemble items, account for items. See for example, Bar Code History Page at http://www.adams1.com/pub/russadam/history.html. Bar codes however were first used to track the movement of cars on trains. See the History of Bar Codes, http://escher.cs.ucdavis.edu:1024/CS15/history.html. Interestingly bar codes, bar code readers through OCR and UPC itemization all developed independently of each other. The confluence of these technologies produced a serendipitous revolution in tracking and sales.

The advent of bar code (or bar code) scanners have revolutionized point of sale activities and movement tracking abilities. However, in a retail environment, point of sale information does not tell a complete story. Establishments must reconcile with amounts ordered, and amounts on-hand or in stock.

(iii) Web-Based Ordering

The Internet was originally developed as ARPANET and then as DARPANET of the Department of Defense as a network which would provide uninterrupted communication in the event of a nuclear war. Later, at CERN, an English scientist Tim Berner-Lee, who now holds an endowed chair at MIT, developed hypertext language and certain protocols. After the personal computer revolution of the 1980s, and the opening of the Internet to educational institutions, the Internet was made available to the public at large.

The Internet was used for different protocols and effect. Certain clients were used for electronic mail (email), while others were used for file transfer (FTP—file transfer protocol), and browsing (first by Mosaic, then Netscape and Explorer as noteworthy examples).

Commercial communication has been enhanced and utilizes all of these abilities. Email can replace facsimile is a paperless, now nearly instant form of person to person or business to business (B2B) communication. Purchase orders for example can be transmitted as email requests. Browsing is used ubiquitously for personal and business ordering. A vendor creates a website, in which a purchaser enters order information. The order information is stored electronically. In some circumstances corporations have endeavored to create automated fulfillment with some success (Amazon.com for example). However the process of entering the data is still laborious for the purchaser.

File Transfer Protocol—FTP—can be used to automatically transfer files between computers. In 1972–3, AT&T's then Bell Labs developed the "C" computer language and the Unix operating system, first developed to serve as a network switching facility. During the development of telephonic capabilities, Unix researchers created the UUCP and UUX commands which permitted automated dialing and modem hookup between Unix based computers with the option of bidirectionally transferring files (UUCP—Unix to Unix copy) and bidirectionally executing commands at remote locations. The FTP technology was developed to facilitate transfer of files between dissimilar computer systems.

With the ability to integrate FTP, bar code and scanning technology, hand-held computing and web-based ordering a technological revolution in ordering and fulfillment is possible. The present invention harkens the arrival of this new age.

Therefore:

Scanners and bar code readers have not been integrated with PDAs in small to medium sized businesses to:
  function independently of a computer system;
  integrate with a computer system;
  deal with complex situations such as multiple vendors, multiple locations, multiple clients;

automatically integrate with purchasing and on-hand accounting systems;
automatically integrate with automated sales ordering.

And generally in businesses and government organizations:
track the movement of items, units, samples or evidence;
track the use of supplies;
track the manufacturing process from parts to assembled items.

At this time, scanners, which have the ability to scan bar codes have been integrated with PDAs by companies such as Symbol. However, the intelligence within the PDA has not been effectively exploited until this time. The present innovations directly exploit the abilities and intelligence of the PDA integrated with the technologies of scanning and bar code development.

B. Applications (i) Flow of Items through a Controlled Environment.

With regard to the sales of goods, wholesalers, retailers, and merchants of all kinds have in days past performed inventory control functions by counting the number of items for each type of item or product and then tabulating the same. Originally, such methods were accomplished by paper and pencil. A merchant would close the enterprise periodically to take stock of the inventory on the shelves and in the stockrooms and correlate the on-hand stock with the inventory sold, lost, missing, or damaged. In a large enterprise this is a laborious and costly undertaking. In a company which stocks tens of thousands or even a hundred thousand individual items, the task is daunting and inaccurate.

With the advent of the computer cash register, and the bar code reader, reading SKU'S, UPC codes, the number of items sold was tabulated by the bar code . This provided point of sale information giving snapshots of the movement of inventory. However, there are several elements of inventory movement: inventory is received through purchasing, placed in storerooms or directly on shelves, then items are lost, damaged, misplaced, stolen, transferred, or sold, and then at the point of sale, those items that are sold are tabulated. The manager must reconcile the inventory obtained with the inventory on-hand and with the inventory that has been sold or otherwise no longer available.

From an accounting point of view, it is important to perform these tabulations to calculate future and seasonal usage, profits or losses, assets and to ascertain problems and trends. There are economies of scale, such that in many industries, the need to survive involves expanding the store, the number of items and kinds of items available, and the number of outlets. For example, in the vitamin and supplement industry, a single outlet may carry 5,000 to 100,000 different items, given the size and comprehensiveness of the outlet. A given vitamin may be sold in different potencies. Then there are bottles of the same potency with different quantities. The same potencies and quantities may be obtained from different manufactures. The same manufacturer may make the same items available through different distributors or vendors. Additional subtle factors come into play. Some items sell better seasonally. Some items are priced at special prices by the vendor. Some items due to trends or quality become top sellers. Some vendors have better return policies. Sometimes a vendor is unable to supply merchandise and offers the merchandise on a back-order status to the enterprise. Many items have expiration dates, and must be discarded if not sold by a certain date. All of this needs to be controlled and referenced to efficiently manage a business. The purchasing manager has to determine the number of items on hand, and the predicted usage, and then the best source to purchase these different items. There has been a long felt need to have a comprehensive way to track the movement of inventory items, predict usage, tabulate amounts on hand, and order from appropriate vendors.

Once the sums of inventory on-hand and inventory sold has been tabulated, then the inventory manager could study trends, determine which items to order, and in which quantities, and then place the order with the appropriate vendors for each item. During the process of ordering, the inventory manager analyzes product movement, compares prices between different vendors, creates purchase orders, and submits these orders. When the product is received, the inventory manager would stock the inventory, verify shelf-tag pricing, print new shelf-tags if needed, manage inventory stock levels, and analyze product movement again.

The distributor of items has analogous problems. A distributor is typically a company that buys products from different manufacturers, stocks product, and resells the product at a markup. A distributor wants to keep the shelves of many stores stocked. Often the distributor's sales agent will go to a store, and travel to different aisles and shelves and count the on-hand inventory. The sales agent will determine how much product is in the stock room. The sales agent will have to tabulate and predict the amount of stock that has been used since the last sales cycle. Then the sales agent will create a purchase order for the store, get an OK, and order the merchandise for the store. In the case of the store, or chain of stores, there are multiple vendors for multiple items with different packaging, manufacturers, vendors, and locations. In the case of the distributor, there are multiple stores or chains of stores within the sales agent's territory. Close analysis shows that this is essentially an identical analytical problem. A broker is usually considered a sales agent who does not purchase or stock inventory, but rather acts as an outside agent for a manufacturer or distributor. Distributors, manufacturers reps, brokers, and sales agents work with relatively low margins and high volumes. Any efficiencies in tabulation, prediction, and ordering will permit more sales calls in the same time, and substantially greater profitability.

There exists now systems using hand-held computer scanners which can tabulate the number of items on-hand for a given manufacturer or line. However, none of these is programmed to maintain a history of sales, account for multiple locations, account for multiple stores and/or account for multiple vendors and account for multiple clients.

A similar situation is found in the case of industries which maintain large amounts of inventory for internal use and consumption which may be later charged to a customer. For example, a hospital stock room, a veterinary hospital, a doctor's office may stock enormous quantities of goods that are expensive and quickly deployed. Stock room nurses have the daunting task of controlling the flow of goods, accounting for the use, and reordering in a timely fashion. The same problems of multiple vendors, multiple locations, predictive use, cost comparisons, and usage accounting exist.

In a manufacturing environment, often a large number of component parts are assembled to create a fewer number of assembled parts or items. Managers must ascertain the number of each item on hand, predict the future needs, determine competitive sources and pricing, and account further for the creation of the assembled units. In this situation a relatively large number of component parts flows in and a different number of assembled parts flows out. There exists large ERP computer database systems for factories to do high level accounting and management, but there are not intelligent hand-held computer scanners used to optimize efficiencies.

In the analogous situation of the flow of items, an important item may flow from one handler to another. Take for example government environmental testing of soil samples. A field agent takes multiple samples, labels each, keeps each sample under strict control until it is passed on to a receiving agent who under strict control stores the sample until it is transmitted to a lab where the sample is analyzed and then placed in post testing storage. The chain of custody must be carefully controlled. Similar situations are found in law enforcement agencies of all types. The chain of custody for evidence must be carefully controlled and an authority must be able to testify to the authenticity of a sample or other physical evidence. Therefore the are needs for an automated system to track the source of a sample, the sample itself, and then the history of the sample through a chain of custodians.

In each of these situations, a situation exists where either a bar code is already affixed to a unit, with the identification created by the Uniform Product Counsel, thus producing a UPC code, or a situation in which a bar code unit number (often a SKU—stock keeping unit—a commonly used term to denote a means for identifying units) could be affixed to an item or a box or container storing that item, to track the flow of that item through an environment. This is an abstract mathematical analysis of the flow inventory through a store or chain store, or through a medical supply room, or a sample through a custodial chain in legal or governmental or scientific environments. This system has been laborious in the past and errors are common. Errors bring a loss of efficiency which brings substantial costs in profitability or success of an enterprise.

Greater efficiencies would take place if multiple personnel could perform the above referenced tasks simultaneously. There is a great need to organize and automate the entire inventory control process of small to medium businesses through the use of hand-held computer scanners.

(iii) Remote Storage

An additional problem that has occurred is the storage of data in hand-held computer scanners as independent data storage devices. Once a sales agent has scanned a stockroom or a sales facility such as a retail store, the agent must download and transmit the data. Additional advantage would obtain if a history of items or inventory is maintained in the hand-held computer scanner.

(iv) Perpetual Inventory

An additional problem is further involved in questions regarding how many items are on-hand at a given time versus how many items have been sold. When purchase orders are fulfilled, product is received by the enterprise. The enterprise may have ordered 100 of a given item, but there may be only 10 or none received. Or there may be 3 shipments at different time, or any given combination which may not equal the exact amount purchased. Therefore the purchase order may not be reflected in its fulfillment. Then, once inventory is stocked, items may decrement for various reasons: items may be lost, damaged, discarded, misplaced, incorrectly accounted for, stolen, returned, transferred to other locations, replenished or utilized as sold or used in manufacture or sampling. Some enterprises attempt to account for the movement of every item. This is a very difficult task. Others estimate losses and purchase order adjustments.

There is a need for an efficient means of automatically estimating the amount to order. With just point of sale information, perpetual inventory is a very rigid, inflexible and difficult task. There is a need to integrate point of sale information with on-hand information.

(iv) Automated Ordering

In the past, the way to make an order of product involved estimating the needs for a purchase and then transmitting the same to a vendor. Often the transmission involved making a telephone call or faxing or mailing a purchase order that had been created. In the last several years, with the explosion of the use of the Internet, companies have placed orders over the Internet. This often takes the form of logging in to a given website, and filling out an on-line purchase order. However, this really only obviates the need to use a facsimile and while this may create efficiencies for the vendor, does little for the purchaser. Often navigating through a website is more cumbersome than filling out a form on paper or making a telephone call. There is a need to bring greater efficiencies in ordering for small to medium sized businesses, particularly those with significant numbers of inventory items and/or those with multiple suppliers.

SUMMARY OF THE INVENTION

This system brings is a hand-held computer bar-code scanner usefully programmed with instruction steps to allow the tracking of bar-code affixed items with regard to useful parameters such as location, aisle, shelf, description, identifier code, unit size or potency, unit quantity (the quantity one unit comes in, for example 100 capsules of 25,000 IU vitamin A, or box of 100 6×32 Phillips head steel screws), actual quantity, transaction history, dates of transactions, dates of sales, prices and quantities at sales, vendors, clients, The system is used to tabulate inventory for in the alternative purchasers of product optionally with multiple locations or alternatively with sales reps, brokers, distributors serving multiple clients.

Similarly the system may be used to track the movement and usage of items in the process of assembly. Similarly the system may be used to track the movement and location of any items such as samples or evidence in a chain of custody.

Perpetual inventory has always been a laborious process. But the overall purpose of taking perpetual inventory is to predict how many units of each item to reorder. Most companies cannot afford the costs of doing a perpetual inventory. Large warehouse type outlets often have substantial budgets for data processing on a global level to develop and maintain an infrastructure to track inventory movements. However, the point of sale system determines the usage, and the inventory numbers from the hand-held computer scanner provides the number which need to be replenished. In this way, the significant problems of the traditional perpetual inventory system of determining loss, returns, damaged and discarded goods, stolen goods and transferred goods are entirely avoided. This data will form the basis of the prediction of the quantities to be ordered during the next order cycle. That is by loading the scanner with the sales quantities sold, the quantities required are determined. Then inventory of on-hand stock, tabulated by use of the scanner provides the input to determine the replenishment quantities of stock. These quantities are utilized to create and transmit purchase orders. Therefore the problems of perpetual inventory and ordering are solved by the operable interaction between the hand-held computer scanner and a point of sale operably configured to produce data that is derived from a combination of each.

In the case of the use of the system as means to track inventory, then the system may be operably configured to produce purchase orders. The purchase orders may be printed in hard copy, printed in facsimile form, directly transmitted by facsimile, or operably configured to interact directly with other computer systems by modem, wireless modem, snap-on modem, infrared connectivity, direct Internet connectivity through Internet protocols such as WAN, LAN, ISDN, DSL, T-1, T-3 or any other direct Internet connectivity. The system either through an intermediary computer or directly through the Internet may automate the ordering process through intelligent interaction with an ASP based of FTP based Internet server, thus automating the entire inventory process from the entry of tabulated of amounts on-hand to the request for procurement directly from a vendor chosen to have the most advantageous pricing. The system permits data to be sent to multiple suppliers.

The System, the hand-held computer scanner, further may verify shelf tag pricing, print new shelf tags, manage inventory stock levels, analyze product movement, find products by location, compare prices between different retailers, and entirely manage and control the inventory process.

DETAILED DESCRIPTION

Data Gathering

Figure 1:
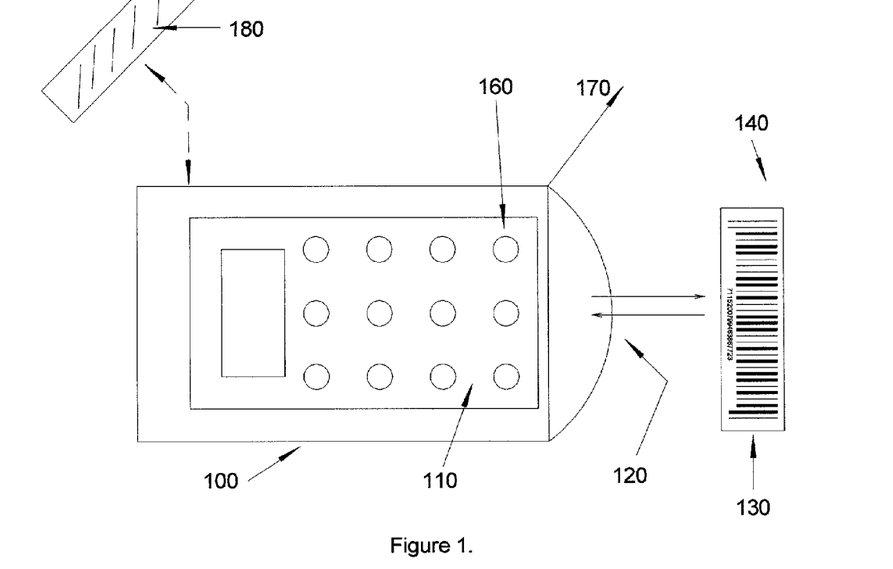
FIG. 1 depicts a hand-held computer scanner in relationship to an item with a bar code.

FIG. 1 depicts a hand-held computer scanner 100 with the scanner 120 scanning a bar code 130 of an item 140. The hand-held computer scanner has been preferably programmed to exhibit a large virtual numeric keypad 110. The virtual numeric keypad was programmed so that a user can touch the screen with the fingers to enter the data, thus preferentially not requiring the use any special data entry pens or instruments. The screen 160 can also display printout from the data structures programmed within. The hand-held computer scanner 100 has built-in audible sounds 170 available. An optional label printer 180 is available as needed in preferred embodiments requiring shelf-label printing.

Figure 2:
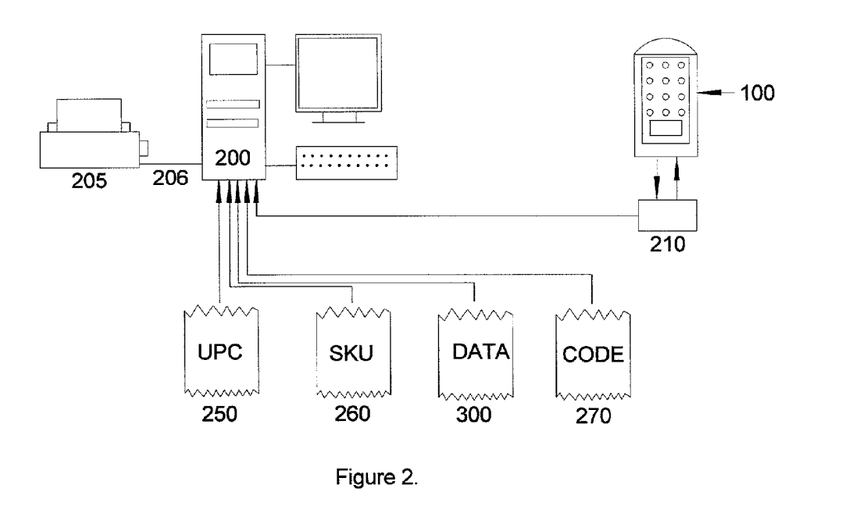
FIG. 2 depicts a hand-held computer scanner preferably in relation to a stand alone computer with data structures and programs.

FIG. 2 depicts a standard stand-alone computer 200 such as a PC based computer operably connected to a hand-held computer scanner cradle so that data and programs are transferred from the computer 200 to the hand-held computer scanner 100. The computer 200 has a database such as the database of all UPC 250, Uniform Price Code codes from the UCC, the Uniform Code Counsel, relevant to the industry for the intended use of the ready to download to the hand-held computer scanner 100. In one preferred embodiment, the UPC codes of the vitamin and supplement industry are downloaded. In another preferred embodiment, in stead of UPC codes, other bar codes, SKUs 260 are preferentially downloaded. The user may customize bar codes appropriate to the industry or needs. In the case of manufacturing, the UPC codes 250 and customized bar codes, SKUs 260 may both be downloaded as long as the user carefully chooses SKUs 260 that do not conflict with known and used UPC codes 250. The manufacturer may choose to label intermediary products with bar codes and the end products with different bar codes and the boxes of end products with different bar codes. In each industry and application there is a preferred embodiment determine by the facts and necessities of that industry. But in each case the data structures 270 are the same: an item is associated with bar code. There will always be code 280 associated with a description 290. A printer 205 is optimally available if needed.

Figure 4:
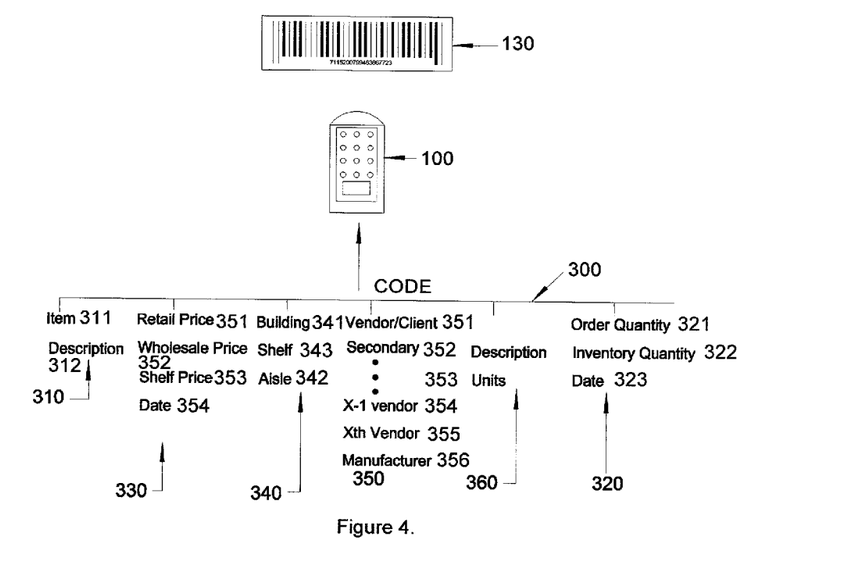
FIG. 4 depicts extended data structures in a preferred embodiment.

FIG. 4 depicts a more extended teaching of a preferential embodiment of the data structure 300. This extended data structure rather than depicting the relational database schema, an area of knowledge that an individual reasonably skilled in the art can facile recreate, rather teachers the kinds of data items required. The descriptors 310 indicate the item 311 and extended description 312. These fields will be found in essentially all applications in any industry. The quantity descriptors 320 are preferentially found in all wholesale, retail, and manufacturing contexts where quantities vary and are tracked. In sales industries, the order quantity 321 is tracked separately from the inventory quantity 322 and the date of entry 323.

In an industry where the hand-held computer scanner 100 is being used to track items available from multiple vendors, the vendor descriptors 350 include primary vendor 351, secondary vendor 352, tertiary vendor 353 until all vendors are exhausted, the x-1 vendor 354 and the xth vendor 355. The manufacturer 356 is also entered. In another preferred embodiment, where the sales agent is tracking multiple clients, stores, locations, hospitals or customers, then the preferentially the system tracks customers in a similar fashion.

In FIG. 4 the location of the item is saved in location descriptors 340 where building 341, aisle 342 and shelf 343 are entered. When the items tracked are being sold, then in a preferred embodiment, the pricing scheme 330 is tracked including retail price 351, wholesale price 352, shelf price 353 and date 354.

As depicted in FIG. 2 the appropriate data structures 300 are downloaded into the handheld computer scanner 100. The data structures are operably related according to pre-programmed instruction sets 270 which are also downloaded into the hand-held computer scanner 100. Various means of downloading data structures 300 and program instruction sets 270 can be preferentially utilized.

Figure 5:
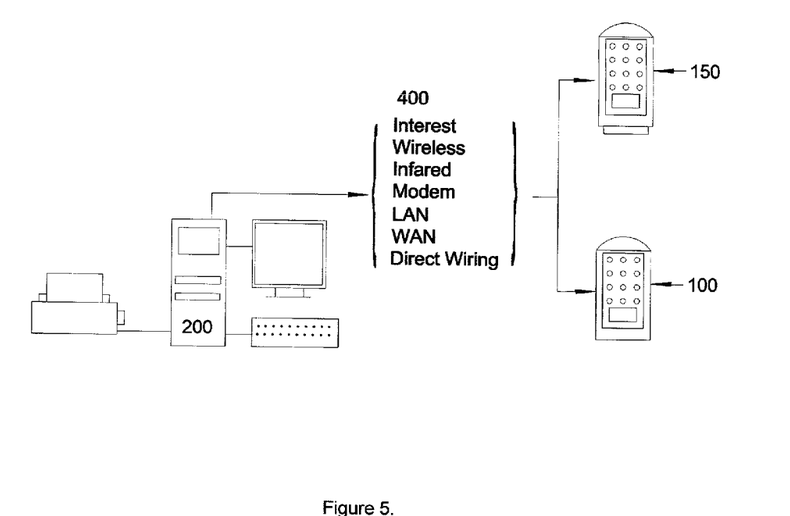
FIG. 5. depicts the interrelation correspondence and operability between hand held computer scanners, a stand alone computer system and preferred options for intercommunication.

FIG. 5 depicts the schematic of the bidirectional connection 400 between the hand-held computer scanner 100 and the digital computer 200. The operational connectivity can be preferentially obtained through the selection at any given time of the Internet, wireless connectivity, infrared connectivity, modem connectivity, LAN, WAN, or direct wiring found in table 410. The choice of connectivity 400 can be made or changed at any time, as long as the appropriate hardware is available. For ease of use the direct connection 410 is preferred. However for remote reprogramming other choices may be required and preferential. In a preferred embodiment multiple hand-held computer scanner 100s can be used such as hand-held computer scanner 150.

Figure 3:
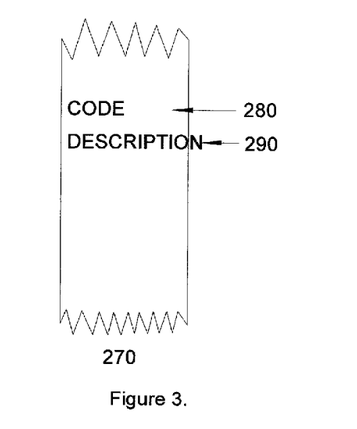
FIG. 3 depicts a basic data structure useful to application.
Figure 6:
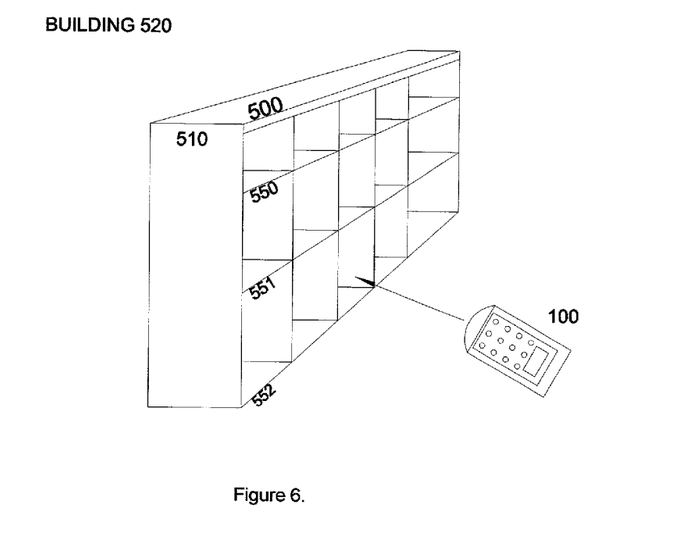
FIG. 6 depicts a building with an aisle with a shelf with items to be scanned and tabulated: an application of the system.

Once the hand-held computer scanner 100, and additional hand-held computer scanners 150 and so forth as required are set up as taught in the preceding steps, the device is used. In one preferred embodiment a user takes inventory of stock in building. FIG. 6 depicts a building 520, in which there are aisles 510, shelves 500 on each aisle, and items 550, 551 and 552, on the shelf 500. The user walks along the aisle 510, and stops at the first stock item 550 and scans the bar code. The hand-held computer scanner 100 reads the code and displays the item on the screen 160. The user correlates the item and insures that all the descriptors (see FIGS. 3 and 4) are correct. In the case of certain items such as sale items, the hand-held computer scanner 100's bell 170 rings to alert the user. The same item can be displayed preferentially on the screen 160 of the hand-held computer scanner 100.

If the shelf label is missing the user may preferentially print a label using the printer 180. The hand-held computer scanner 100 is also preferentially programmed so that the user may be directed to different items by pre-programmed orders such as by client 360, and/or by vendor 350, or by item location 340, or by item type 310. This is particularly useful when the same item 550 is stored in different locations within the same building, a common practice in the retail industry.

The hand-held computer scanner 100 is pre-programmed to alert the user to a list of items which are to be scanned but have not yet been scanned. New items 552 can be entered by the user and a shelf label can be printed by the printer 180 if needed. However the system is preferentially and optimally programmed so that the same bar code whether it is UPC, SKU or any customized code cannot be used for different items.

Figure 7:
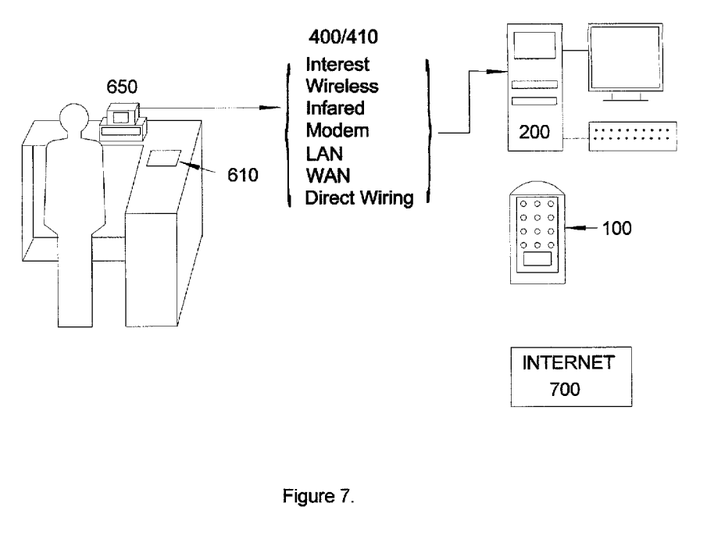
FIG. 7 depicts a point of sale tabulating register interactively cooperating with optionally a handheld computer scanner and/or a stand digital computer.

In another preferred embodiment a bar code scanning cash register 600 serves as point of sale register tracking each item sold. The register preferentially captures the item, the date, the quantity and the amount charged. These data items are stored. At the close of each ordering cycle, the register 600 data is copied to a tabulation device, either a stand alone computer 200, a hand-held computer scanner 100 or some other computing system through the Internet 700. The means of transferring data 400 as before includes a table 410 of all known means at any given time.

The information regarding the amount of each item sold is predicts the amount required for the next sales cycle. In one preferred embodiment this number is transformed by algorithms placing different weighted ratios determined by seasons, by trends, or by user-input values. The amount used during a sales cycle is compared with the amount in stock captured in the hand-held computer scanner 100 to mathematically determine the quantity to be ordered. This innovation relates to a point of sale modified perpetual accounting system which does away with the laborious and difficult requirements of otherwise tracking lost, damaged, stole, returned, transferred or otherwise uncountable inventory.

In another preferred embodiment, multiple hand-held computer scanners 100, 150 and so forth are utilized to preferentially take stock of numerous items over a shortened period of time. In the case of multiple scanners, there must be at least one device to act as a repository for the totality of the data collected. For example a stand alone computer 200 or one scanner 100 can perform this task.

The process of taking stock of items on-hand as depicted in FIG. 6 is identically the same whether the environment is wholesale, retail, manufacturing or distributing. When a sales agent travels from client to client, store to store, hospital to hospital, and so forth, the inventory stock taking process is the same. When an officer tracks the chain of custody of an item or evidence, then the same item is tracked but the location and incidental data vary over time.

Compilation

Once the data has been gathered, then the system requires compilation of the data. In one preferred embodiment, and in the most simple form, data from the hand-held computer scanner 100 and other hand-held computer scanner 150 if used is uploaded to a stand alone computer 200. It is irrelevant whether this is the same stand alone 200 used to download data structures and programs. All captured data is uploaded with the assurance that each data item is loaded only once. The stand alone computer 200 hen correlates the data preferentially according to the needs of the application. For example, in the case of store or supply room or client who wishes to prepare purchase orders, the quantities and items for a given order cycle are tabulated and sorted to printout vendor-correct purchase orders on a printer 205.

In the case of a distributor who travels to many clients, then the computer 200 prints out on the printer 205 separate purchase orders for each client.

In the case of a manufacturer, the computer 200 prints out on the printer 205 appropriate stock and inventory requests as needed for the manufacturing cycle.

In the case of a tracking of evidence or items, the movement of the items is tabulated on the computer 200 and the printer 205 prints out movement, custody, and location reports.

In every case, output 206 emerges from the computer and is translated into hard copy by the printer 205. There are other options which shall be discussed.

However in another preferred embodiment, no stand alone computer 200 is required. In the case of a single hand-held computer scanner 100, all data flow can be tabulated in the handheld computer scanner 100 itself, and directly output 206 to a printer 205. The hand-held computer scanner has in the past been untapped as a computing device of surprising rectitude. When two or more hand-held computer scanner 150 are utilized then one hand-held computer scanner 100 or one computer may be used to tabulate the totality of the data. Thus the tabulation can take place in one hand-held compute scanner, or in a stand alone computer 200 or any combination of computers on or offsite.

The system can easily adapt to a multiplicity of circumstances. The specification herein in no way limits the use of the system to the preferred embodiments disclosed herein. The same system can be applied to a multiplicity of industries and circumstances.

The system provides for the editing of data and reports if permitted by the application, and the output 206 includes but is not limited to:

producing inventory purchase orders;
producing inventory exception reports (items not scanned);
producing inventory reports;
producing inventory location reports;
producing inventory comparison reports;
producing inventory vendor reports;
producing inventory shelf labels;
producing inventory purchase order financial reports;
producing inventory UPC codes in item order;
producing inventory UPC codes in shelf order.

Once the tabulation has been completed, and appropriate output is selected. In the case of a preferred embodiment of movement tracking then the output may be written or stored reports. In the case a preferred embodiment of inventory tracking for the sake of ordering of inventory, then other options are available to the user.

Automated Ordering and Output

Figure 8:
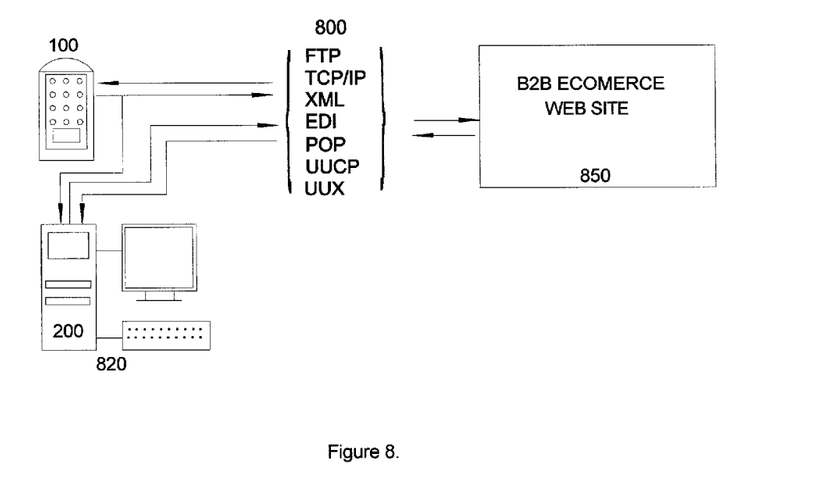
FIG. 8 depicts a hand-held computer scanner system and/or a stand alone computer bidirectionally communicating with a B2B ecommerce website.

FIG. 8 depicts an automated ordering environment for a hand-held computer scanner 100 preferably and operably connected to a B2B ecommerce website 850 or connected to a computer 200 which is preferably and operably connected to a B2B ecommerce website 850. In a preferred embodiment which involves ordering, the system may preferentially be used to print reports and purchase order forms. However, there has been a proliferation in recent times of B2B ecommerce websites. A B2B (business to business) ecommerce (electronic commerce) website is an Internet address which is designed to automatically fulfill an ordering process. As discussed earlier, when a purchaser enters data on a website by hand, the efficiencies of automation are granted to the seller, whose data is entered by the buyer, but has no advantage in effort to the buyer, who may perhaps be trading sweat of brow for increased efficiencies in price and fulfillment.

However, modem computer connectivity provides for bidirectional computer communication. Various protocols 800 are available for data transfer between computers. These protocols include FTP (file transfer protocol), modem, TCP/IP, XML, EDI, POP, and UUCP and UUX (Unix to Unix). Other protocols may come into existence or may become known and the system is no way diminished by such facilities.

The system 820 may provide electronically correct purchase orders directly to a B2B ecommerce web-site. The ecommerce company may automatically process the purchase order and fulfill the same. It is not beyond reason to see the entire process from tabulation through order fulfillment to be entirely automated with human intervention limited to monitoring the process. The B2B ecommerce web-site may provide bar codes (UPC, SKU or custom) to the system 820 as well as recent pricing and availability information.

This innovation heralds an era when hand-held computer scanners can tabulate inventory for multiple locations, multiple items, multiple vendors, multiple clients or stores and automatically order items for fulfillment without any data entry after the initial set up and the periodic counting of the quantities on hand.

I claim:

1. An electronic inventory control ordering and management system that permits a person to manage the inventory and procurement for a multitude of items in a multitude of locations, comprising:
    a hand-held computer scanner equipped with a bar code reader, preprogrammed to print UPC bar code shelf labels, and equipped with a keypad for inputting data wherein the hand-held computer scanner operably and bidirectionally communicates with a digital computer system; such communication selected from wireless device, modem, electronic cables, infrared device, radio frequency based device, network based device; and
    a database operably configured to include items, a history of items, a source of items, and a description of items is maintained, said database consisting of:
        a first table consisting of item identifier, UPC code, description, retail price, shelf price, wholesale price, unit size, unit description, unit type identifier, manufacturer, primary vendor:
        a second table consisting of source item identifier, source of item, address of source, contact of source, telephone number of source, fax number of source, email address of source, automated ordering information of source:
        a third table consisting of item identifier, source of item:
        a fourth table consisting of unit type identifier, unit type:
        a fifth table consisting of location identifier, location description:
        a sixth table consisting of location identifier, item identifier:
        a seventh table consisting of item identifier, source of item identifier, order identifier, number in area 1, number in area 2, number in area 3, date order created, number ordered, date submitted; and
        an eighth table consisting of item identifier, date transferred, quantity, location identity, such information being captured from a point of sale register device.

2. The inventory control management system as set forth in claim 1 wherein the description of the item scanned can be operably configured in the database or entered manually by UPC code.

3. The inventory control management system as set forth in claim 1 wherein information for a multiplicity of locations is operably entered.

4. The inventory control management system as set forth in claim 1 wherein vendor-correct purchase orders are operably produced.

5. The inventory control management system as set forth in claim 4 wherein the vendor-correct purchase order may be displayed and edited.

6. The inventory control management system as set forth in claim 4 wherein said vendor-correct purchase order forms are automatically transmitted to a vendor by one of facsimile transmission, email transmission, network transmission, computer printout, wireless transmission.

7. The inventory control management system as set forth in claim 4 wherein quantities for purchase orders are calculated from a selection of one of user specified quantities, historical quantities, predictive use quantities.

8. The inventory control management system as set forth in claim 7 wherein said predictive use quantities are calculated from a ratio multiplied by calculated amount used over a specified period of time.

9. The inventory control management system as set forth in claim 1 wherein quantities for purchase orders of each item are calculated from said table eight including point of sale data.

10. The inventory control management system as set forth in claim 1 wherein said system produces reports displaying competitive pricing of items.

11. The inventory control management system as set forth in claim 1 wherein said system produces shelf tags.

12. The inventory control management system as set forth in claim 1 wherein said system is operably configured with point of sale checkout devices to provide data to the inventory control management system regarding items sold, amounts, prices, location.

13. The inventory control management system as set forth in claim 1 wherein said system is operably configured to permit the tabulation for multiple vendors.

* * * * *